(12) United States Patent
Braun

(10) Patent No.: US 8,537,417 B2
(45) Date of Patent: Sep. 17, 2013

(54) METHOD FOR IMPROVED PRINTER CHARACTERIZATION

(75) Inventor: Karen M. Braun, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 3417 days.

(21) Appl. No.: 10/670,902

(22) Filed: Sep. 25, 2003

(65) Prior Publication Data

US 2005/0068550 A1 Mar. 31, 2005

(51) Int. Cl.
*H04N 1/56* (2006.01)
*H04N 1/60* (2006.01)

(52) U.S. Cl.
USPC .............................. 358/1.9; 358/504; 382/274

(58) Field of Classification Search
None
See application file for complete search history.

(56) References Cited

U.S. PATENT DOCUMENTS

| | | | | |
|---|---|---|---|---|
| 4,003,653 A | 1/1977 | Kelly, II | ................ | 355/77 |
| 4,149,185 A | 4/1979 | Weinger | ................ | 358/81 |
| 5,153,576 A | 10/1992 | Harrington | ................ | 340/793 |
| 5,521,708 A * | 5/1996 | Beretta | ................ | 356/402 |
| 5,532,848 A | 7/1996 | Beretta | ................ | 358/504 |
| 5,557,430 A | 9/1996 | Isemura et al. | ................ | 358/501 |
| 5,604,567 A | 2/1997 | Dundas et al. | ................ | 399/39 |
| 5,701,401 A | 12/1997 | Harrington et al. | ................ | 395/109 |
| 5,726,781 A | 3/1998 | Isemura et al. | ................ | 358/530 |
| 5,791,781 A * | 8/1998 | Park et al. | ................ | 374/159 |
| 5,995,714 A | 11/1999 | Hadley et al. | ................ | 395/109 |
| 6,169,607 B1 | 1/2001 | Harrington | ................ | 358/1.9 |
| 6,179,485 B1 | 1/2001 | Harrington | ................ | 395/109 |
| 6,215,562 B1 | 4/2001 | Michel et al. | ................ | 358/1.9 |
| 6,480,299 B1 * | 11/2002 | Drakopoulos et al. | ......... | 358/1.9 |
| 6,934,053 B1 * | 8/2005 | Mestha et al. | ................ | 358/1.9 |
| 2002/0012461 A1 * | 1/2002 | MacKinnon et al. | ......... | 382/164 |
| 2002/0044292 A1 * | 4/2002 | Yamada et al. | ................ | 358/1.9 |
| 2002/0158933 A1 * | 10/2002 | Yamamoto | ................ | 347/15 |
| 2003/0020727 A1 * | 1/2003 | Newman | ................ | 345/604 |
| 2003/0048464 A1 * | 3/2003 | Yamada et al. | ................ | 358/1.9 |
| 2003/0210395 A1 * | 11/2003 | Takahashi et al. | ............ | 356/405 |
| 2005/0018223 A1 * | 1/2005 | Debevec et al. | ................ | 358/1.9 |
| 2005/0166781 A1 | 8/2005 | Fritz et al. | | |

\* cited by examiner

*Primary Examiner* — Gabriel I Garcia
*Assistant Examiner* — Pawandeep Dhingra

(57) ABSTRACT

A method is disclosed for improving printer characterization tables to best reproduce desired colors on a destination device given the ambient illumination at that device's location. The user determines viewing illumination using a target preferably provided with the printer or alternatively printed directly from the characterized printer. The target comprises metameric color pairs allows which users to quickly determine their approximate viewing illumination by selecting the matching pair. A metameric match of color pairs (metamers) is defined to have equal colorimetric values, XYZ or LAB, for one illumination and differing reflectance spectra. Each color pair corresponds to a different illumination condition. All pairs of metamers which comprise the target are examined to determine which pair is the best match. Targets could be bipartite patches, half-and-half images, readability tasks, or images. The appropriate color-correction transform for the selected illumination is applied. Alternatively the color-correction transform for the selected illumination is modified directly.

16 Claims, 4 Drawing Sheets

METHOD FOR IMPROVED PRINTER CHARACTERIZATION

FIELD OF THE INVENTION

The present invention generally relates to methods for improving printer characterization and, more particularly, to metameric reproduction methods, which account for the viewing illumination of the final print.

BACKGROUND OF THE INVENTION

To get a typical printer's output to match a standard other than the standard that the inkset was designed to match (assuming it was designed to match a standard), a method called color profiling is typically used. Color profiling is an attempt to characterize the printer's colorimetric reproduction characteristics given a specific set of inks, media, and environmental conditions and use this information along with color correction data that attempts to get the printer's output to match a standard.

To characterize a printer, a test chart is printed consisting of a finite set of color patches. The chart is then measured using a calorimeter or spectrophotometer to determine the colorimetry of each of the patches. The colorimetric data is then used to derive a model to map data from one space (CMYK printer counts) to another (XYZ). It is then the job of the color management engine to use the printer model to predict the amount of CMYK ink required to reproduce a given color. This is commonly done using multi-dimensional look-up tables. This is shown schematically in FIG. 1.

Printer characterization techniques most often attempt to reproduce specified colorimetric values (XYZ or LAB) of an original image, also known as a metameric reproduction. This requires an assumption about the viewing illuminant, for example, CIE Illuminant D50. If the viewing illumination of the final print is different than the assumed illuminant, as is often the case, then the resulting viewed LAB values will most likely be different than the requested values even if the characterization technique had no other errors (e.g., interpolation). Thus a mismatch occurs between the reproduction and original values.

In order to account for this, some printers and/or characterization procedures allow the user to specify a illumination by selecting one from a list of illuminations or use a digital sensor affixed to the printer for sensing of ambient illumination. It is desirable to modify the characterization table based on the viewing illumination or to characterize for several possible viewing illuminations and use the appropriate one depending on where the printer is situated or where the prints will be viewed.

What is needed in the arts is a method which allows users to quickly determine their approximate viewing illumination without incurring additional expense or requiring certain expertise particularly with respect to colors not being accurate because the wrong viewing illuminant was assumed for the printer characterization.

BRIEF SUMMARY

A method is disclosed for improving printer characterization tables to best reproduce desired colors on a destination device given the ambient illumination at that device's location. The user determines viewing illumination using a target preferably provided with the printer or alternatively printed directly from the characterized printer. The target comprises metameric color pairs allows which users to quickly determine their approximate viewing illumination by selecting the matching pair. A metameric match of color pairs (metamers) is defined to have equal calorimetric values, XYZ or LAB, for one illumination and differing reflectance spectra. Each color pair corresponds to a different illumination condition. All pairs of metamers which comprise the target are examined to determine which pair is the best match. Targets could be bipartite patches, half-and-half images, readability tasks, or images. The appropriate color-correction transform for the selected illumination is applied. Alternatively the color-correction transform for the selected illumination is modified directly.

DESCRIPTION OF THE SPECIFICATION

The present method chooses or modifies the printer characterization table to best reproduce desired colors for the determined ambient illumination. The target is preferably provided with the printer or alternatively printed directly from the characterized printer.

The present invention improves printer characterization accuracy by first determining viewing illumination using a metamerism target and then choosing the appropriate color-correction table or modifying the color-correction for the selected illumination.

Figure 1:
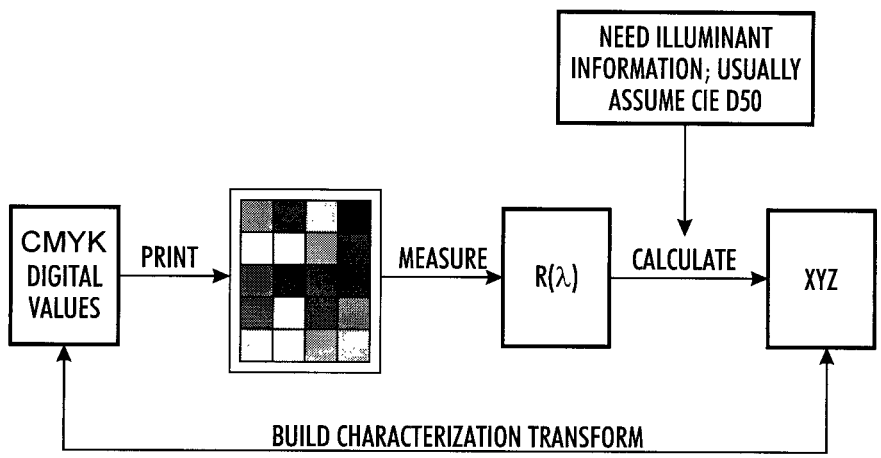
FIG. 1 schematically illustrating the job of the color management engine using the printer model to predict the amount of CMYK ink required to reproduce a given color using multi-dimensional look-up tables.
Figure 2:
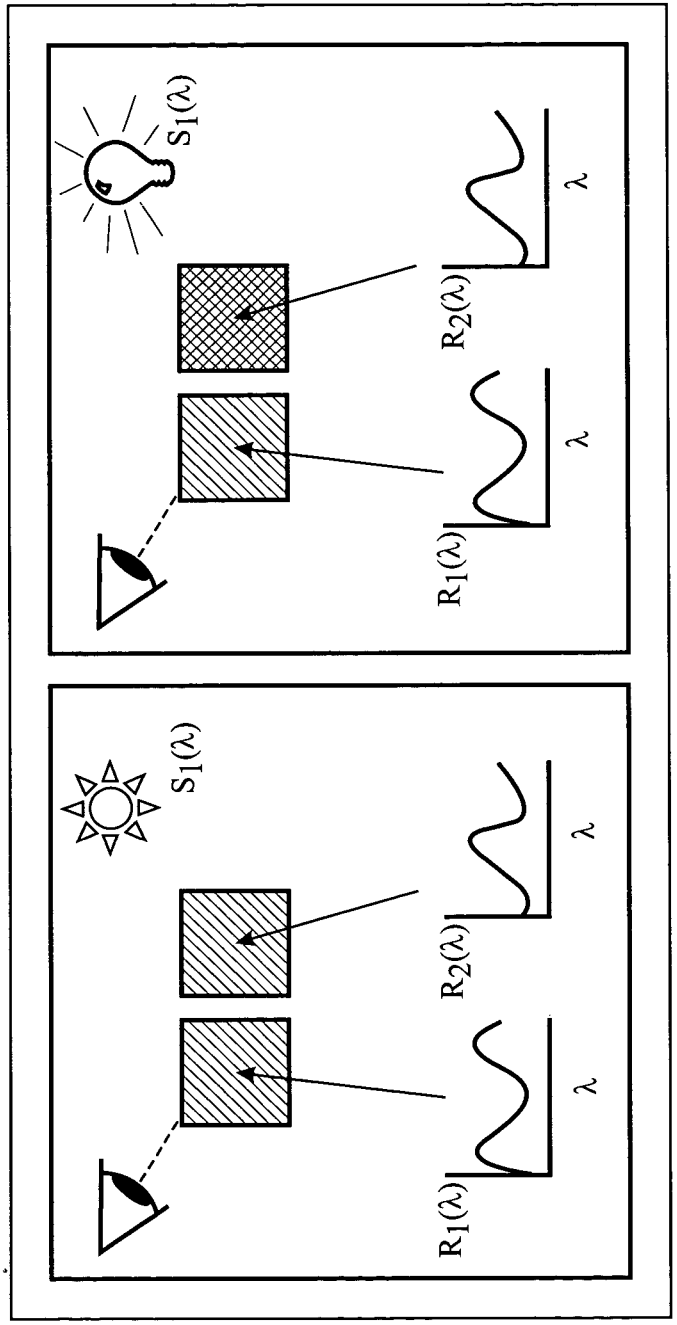
FIG. 2 illustrates the metamerism wherein two patches with different spectral reflectances, $R_1(\lambda)$ and $R_2(\lambda)$, which match under one illuminations $S_1(\lambda)$, and do not match under a second illumination, $S_2(\lambda)$.

With attention now being directed to FIG. 2, a metameric match is one in which colorimetric values, XYZ or LAB, are equal even though the reflectance spectra differ. CIE tristimulus values, XYZ, are described by the following relationship:

$$X = \sum_\lambda R(\lambda)S(\lambda)\bar{x}(\lambda)\Delta\lambda$$

$$Y = \sum_\lambda R(\lambda)S(\lambda)\bar{y}(\lambda)\Delta\lambda$$

$$Z = \sum_\lambda R(\lambda)S(\lambda)\bar{z}(\lambda)\Delta\lambda$$

where $R(\lambda)$ is the spectral reflectance of the colored patch, $S(\lambda)$ is the spectral power distribution of the illumination, and $\bar{x}$, $\bar{y}$, and $\bar{z}$ are the CIE color matching functions. One skilled in this art would appreciate that if the reflectance spectra for two colored patches were unequal, that is, $R_1(\lambda) \neq R_2(\lambda)$, for a given illumination, $S(\lambda)$, but the tristimulus values matched, that is, $XYZ_1 = XYZ_2$, then a change to a second illumination, $S'(\lambda)$, can generate a mismatch in the corresponding tristimulus values, $XYZ_1'$ and $XYZ_2'$.

One process for producing a match from a four-color printer is as follows. For a given illumination, $S(\lambda)$, and spectral reflectance, $R_1(\lambda)$, calculate $XYZ_1$ values as defined above. In the preferred embodiment, $R_1(\lambda)$, is the reflectance of a mid-level K patch. Let that equal $XYZ_2$. Then, using a printer model such as cellular Neugebauer, the CMY values are calculated to produce the tristimulus values $XYZ_2$. If $R_1(\lambda)$ is produced with K or with K and some CMY, the resulting CMY match is metameric.

Producing metameric matches, and thus the illumination-selection target, is simple if gray-balance TRCs are available for the printer and the illuminants of interest. Here, a gray-balance TRC is one for which C=M=Y=n gives the same color and lightness as K=n, where n is some digital value for the printer. One side of the target is produced with K=n and the other side with C=M=Y=n, where CMYK are the pre-TRC values. These values are passed through the TRCs to determine the device value of CMYK with which to print the target.

In the present method, pairs of metamers are produced, such that $XYZ_1 = XYZ_2$ for specific illuminants of interest. A model of the printer makes it possible to determine the appropriate amounts of CMY to match the tristimulus values of a given amount of K for each of the different illuminants. Then all the pairs are examined, which comprise the target, and a determination is made as to which pair is the best match. The selection indicates which illumination the target is being viewed under. Preferably, grays are used, produced with (1) pure K and (2) CMY combinations but other color combinations will also work. Using more than one pair of metamers for each potential illuminant increases accuracy. The user is then instructed to enter his results back into the system (via the DFE or print driver).

Targets could be bipartite patches, concentric patches, readability tasks, or half-and-half images. The target could be shipped with the printer, or could be printed from the characterized printer. The latter is simpler, cheaper, and avoids fading of the target but requires the printer be well characterized (which would likely be the case if one wants to use this technique to improve characterization results).

The illuminant derived from viewing the described target can be incorporated into the characterization in a number of ways. The simplest is to build characterization tables for all the potential illuminants of interest and that are represented in the illumination-determination target. Then each is stored as a separate profile. The user then enters a desired viewing illumination as determined by the aforementioned target at set-up or print time. The printer then uses the appropriate characterization table. Alternately, a single characterization table might be modified by TRCs or with another method to adapt it to the selected illumination.

The present method is extendible to determine display white point. Different display white points cause the emitted light to have different spectral characteristics. One would turn the room lights off and hold a target near the display to see which is the best match, thus determining the white point. Alternately, the target could be a transparency target that is placed over the display. It should be understood that the spectral characteristics of the display at differing white points may not be enough to cause the target to mismatch for the wrong patches on the target. Furthermore, luminance coming from the display may be insufficient to excite anything but the eyeball's rods thereby making trichromatic color matching less than worthwhile. Use of a transparency target would alleviate this.

In summary, a method is provided for improving printer characterization tables to best reproduce desired colors on a destination device given the ambient illumination at that device's location. The user determines viewing illumination using a target preferably provided with the printer or alternatively printed directly from the characterized printer. Targets could be bipartite patches, concentric patches, readability tasks, or half-and-half images. A target of metameric color pairs allows users to quickly determine their approximate viewing illumination. A metameric match of color pairs (metamers) is when calorimetric values, XYZ or LAB, are equal even though the reflectance spectra differ. All pairs of metamers which comprise the target are examined to determine which pair is the best match. The appropriate color-correction table for the selected illumination is used. Alternatively the color-correction table for the selected illumination is modified directly.

Figure 3:
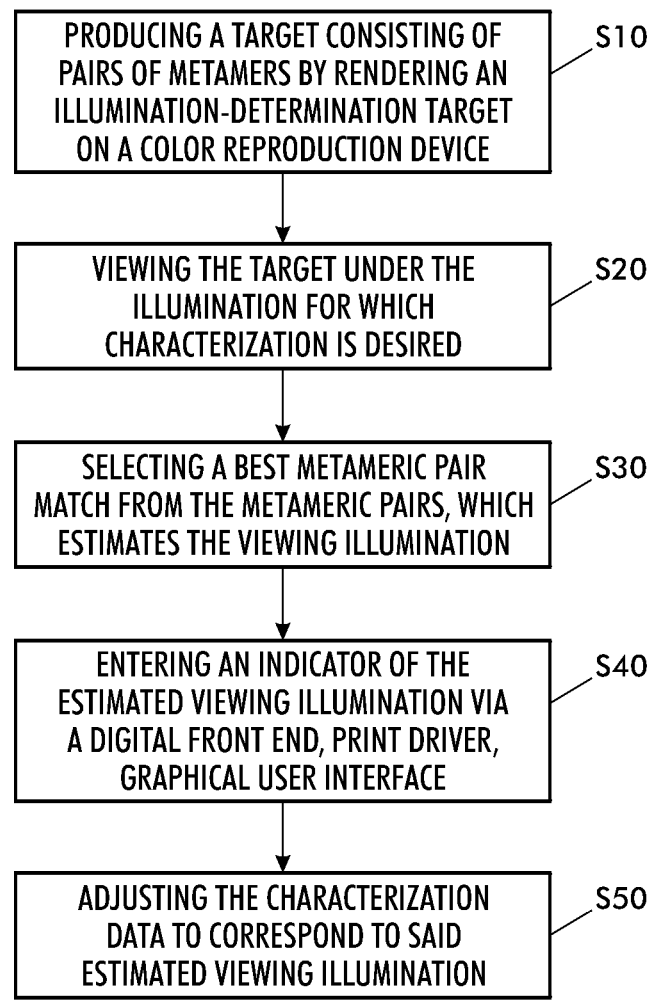
FIG. 3 illustrates a flowchart showing a process for improving printer characterization to more accurately reproduce desired colors on a destination printing device given the ambient illumination at the location where the printer's output is intended to be viewed.

FIG. 3 illustrates a flowchart showing a process for improving printer characterization to more accurately reproduce desired colors on a destination printing device given the ambient illumination at the location where the printer's output is intended to be viewed. As illustrated in FIG. 3, at step S10, a target consisting of pairs of metamers, where each pair matches for one illuminant and mismatches for others, is produced. At Step S20, the target under the illumination for which characterization is desired is viewed. At Step S30, a best metameric pair match from the metameric pairs, which estimates the viewing illumination, is selected. At Step S40, an indicator of the estimated viewing illumination is entered, and at step S50, the characterization data to correspond to the estimated viewing illumination is adjusted.

Figure 4:
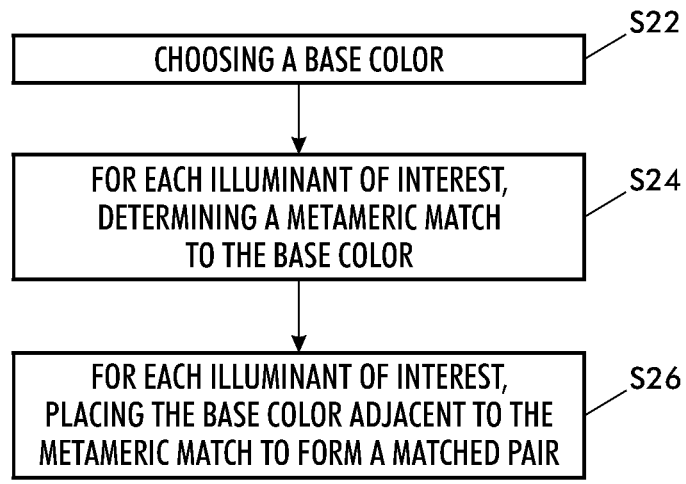
FIG. 4 illustrates a flowchart showing a process for producing targets.

FIG. 4 illustrates a flowchart showing a process for producing targets. As illustrated in FIG. 4, at step S22, a base color is chosen. At step S24, for each illuminant of interest, a metameric match to the base color is determined. At step S26, for each illuminant of interest, thed base color adjacent to the metameric match to form a matched pair is placed.

Figure 5:
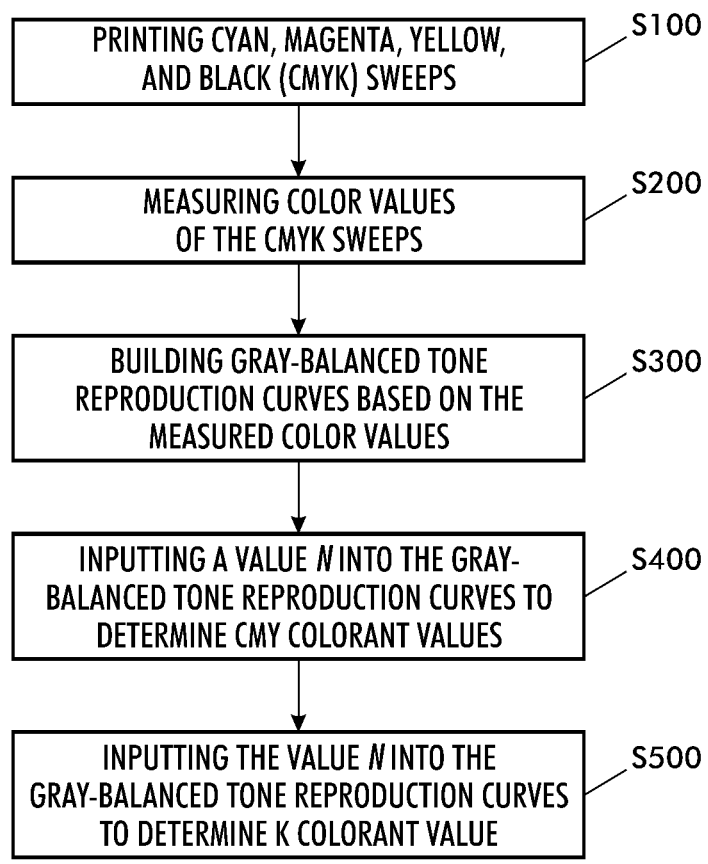
FIG. 5 illustrates a flowchart showing a process for producing the metameric pairs for each illuminant of interest.

FIG. 5 illustrates a flowchart showing a process for producing the metameric pairs for each illuminant of interest. As illustrated in FIG. 5, at step S100, Cyan, Magenta, Yellow, and blacK (CMYK) sweeps are printed. At step S200, color values of the CMYK sweeps are measured. At step S300, gray-balanced Tone Reproduction Curves based on the measured color values are built. At step S400, a value n into the gray-balanced Tone Reproduction Curves to determine CMY colorant values is inputted, and at step S500, the value n into the gray-balanced Tone Reproduction Curves to determine K colorant value is inputted.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for improving printer characterization, by adjusting characterization data associated with a printer to be characterized, to more accurately reproduce desired colors on a destination printing device given the ambient illumination at the location where the printer's output is intended to be viewed, comprising:

a) producing, using the printer to be characterized, a target consisting of pairs of metamers, where each pair matches for one illuminant and mismatches for others;
b) viewing said target under the illumination for which characterization is desired;
c) selecting a best metameric pair match from said metameric pairs, which estimates said viewing illumination;
d) entering, into the printer to be characterized, an indicator of said selected estimated viewing illumination; and
e) adjusting, using a processor, the characterization data of the printer to be characterized to correspond to said selected estimated viewing illumination.

2. A method for improving printer characterization, as in claim 1, wherein the production of the target comprises:
a) choosing a base color; and
b) for each illuminant of interest,
determining a metameric match to said base color; and
placing said base color adjacent to said metameric match to form a matched pair.

3. A method for improving printer characterization, as in claim 2, wherein said metameric matched pairs are produced using different colorants.

4. A method for improving printer characterization, as in claim 1, further converting said base color to device values, CMYK, using said re-characterization.

5. A method for improving printer characterization, as in claim 1, wherein the target includes either bipartite patches, concentric patches, readability tasks, or half-and-half images.

6. A method for improving printer characterization, as in claim 1, further rendering an illumination-determination target on a color reproduction device.

7. A method for improving printer characterization, as in claim 6, wherein the illumination-determination target has been prepared in advance of characterization.

8. A method for improving printer characterization, as in claim 7, wherein the illumination-determination target is shipped or otherwise provided with said destination printing device.

9. A method for improving printer characterization, as in claim 1, wherein said indicator is entered via a Digital Front End or print driver to the printer.

10. A method for improving printer characterization, as in claim 1, further comprising a Graphical User Interface for indicating said estimation of illumination.

11. A method for improving printer characterization, as in claim 1, wherein each illuminant of interest represented in said illumination-determination target is a profile.

12. A method for improving printer characterization, as in claim 11, wherein said profile is applied as a result of the indication of illumination.

13. A method for improving printer characterization, as in claim 1, wherein said estimated illumination is used to modify said characterization via a pre-transformation or post-transformation.

14. A method for improving printer characterization, as in claim 1, wherein device values for metameric matches are derived using a cellular Neugebauer model.

15. A method for improving printer characterization, as in claim 1, wherein one half of each matched metameric pair is produced with blacK (K) only and the other half is produced with Cyan, Magenta, and Yellow (CMY).

16. A method for improving printer characterization, as in claim 15, wherein producing said metameric pairs comprises, for each illuminant of interest:
a) printing Cyan, Magenta, Yellow, and blacK (CMYK) sweeps;
b) measuring color values of said CMYK sweeps;
c) building gray-balanced Tone Reproduction Curves based on said measured color values;
d) inputting a value n into said gray-balanced Tone Reproduction Curves to determine CMY colorant values; and
e) inputting said value n into said gray-balanced Tone Reproduction Curves to determine K colorant value.

* * * * *